US011116020B2

(12) United States Patent
Estevez et al.

(10) Patent No.: US 11,116,020 B2
(45) Date of Patent: Sep. 7, 2021

(54) POWER EFFICIENT TUNNELED DIRECT LINK SETUP APPARATUS, SYSTEMS AND METHODS

(71) Applicant: Texas Instruments Incorporated, Dallas, TX (US)

(72) Inventors: Leonardo William Estevez, Rockwall, TX (US); Ariton Xhafa, Plano, TX (US); Ramanuja Vedantham, Allen, TX (US); Yanjun Sun, San Diego, CA (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

(21) Appl. No.: 16/897,107

(22) Filed: Jun. 9, 2020

(65) Prior Publication Data
US 2020/0305208 A1  Sep. 24, 2020

Related U.S. Application Data

(60) Continuation of application No. 15/289,837, filed on Oct. 10, 2016, now Pat. No. 10,721,782, which is a
(Continued)

(51) Int. Cl.
*H04W 76/12* (2018.01)
*H04W 76/14* (2018.01)
(Continued)

(52) U.S. Cl.
CPC ........... *H04W 76/12* (2018.02); *H04W 76/14* (2018.02); *H04W 84/12* (2013.01); *H04W 88/08* (2013.01); *Y02D 30/70* (2020.08)

(58) Field of Classification Search
CPC . H04W 76/023; H04W 76/022; H04W 76/14; H04W 84/12; H04W 76/12;
(Continued)

(56) References Cited

U.S. PATENT DOCUMENTS 8,064,374 B2    11/2011  Kakani et al.
8,203,985 B2 *  6/2012   Gong ................ H04W 52/0216
                                                       370/311
(Continued)

OTHER PUBLICATIONS

Hiertz, G., et al., "The IEEE 802.11 Universe," IEEE Communication Magazine (USA), Jan. 2010, p. 67.

*Primary Examiner* — Wutchung Chu
(74) *Attorney, Agent, or Firm* — Brian D. Graham; Charles A. Brill; Frank D. Cimino

(57) ABSTRACT

An emulated wireless access point (AP) at a first PMC device (PMC1) establishes a first tunneled direct link setup (TDLS) session between a first station module (STA1) incorporated into the PMC1 and a second station module (STA2) incorporated into a second PMC device (PMC2). Following establishment of the TDLS session, the wireless AP is allowed to sleep; and most infrastructure management duties are handled by the STA1 during the session. PMC device battery charge may be conserved as a result. The emulated wireless AP may also establish a second TDLS link to a third station module (STA3) incorporated into a third PMC device (PMC3). The STA1 may then bridge data traffic flow between the STA2 and the STA3. Such bridging operation may enable communication between two PMC devices otherwise unable to decode data received from the other.

14 Claims, 6 Drawing Sheets

Related U.S. Application Data continuation-in-part of application No. 14/171,993, filed on Feb. 4, 2014, now abandoned, which is a division of application No. 13/109,974, filed on May 17, 2011, now Pat. No. 8,675,529.

(60) Provisional application No. 61/379,635, filed on Sep. 2, 2010.

(51) Int. Cl.
*H04W 88/08* (2009.01)
*H04W 84/12* (2009.01)

(58) Field of Classification Search
CPC . H04W 88/08; Y02D 70/1242; Y02D 70/144; Y02D 70/00; Y02D 70/142; Y02D 70/146
See application file for complete search history.

(56) References Cited

U.S. PATENT DOCUMENTS

| | | | | |
|---|---|---|---|---|
| 8,274,903 | B2* | 9/2012 | Wentink | H04W 76/10 370/248 |
| 8,279,757 | B2 | 10/2012 | Seok | |
| 8,750,185 | B2* | 6/2014 | Seok | H04W 52/0235 370/311 |
| 8,767,600 | B2* | 7/2014 | Seok | H04W 52/0219 370/311 |
| 9,019,943 | B2 | 4/2015 | Dwivedi et al. | |
| 9,258,817 | B2 | 2/2016 | Seok | |
| 9,900,759 | B2* | 2/2018 | Wentink | H04W 8/005 |
| 2005/0036469 | A1* | 2/2005 | Wentink | H04W 52/0216 370/338 |
| 2008/0219228 | A1* | 9/2008 | Seok | H04W 52/0225 370/338 |
| 2009/0073945 | A1* | 3/2009 | Seok | H04W 76/10 370/338 |
| 2009/0279464 | A1* | 11/2009 | Kakani | H04W 52/0219 370/311 |
| 2010/0008274 | A1* | 1/2010 | Kneckt | H04W 74/04 370/311 |
| 2010/0008277 | A1 | 1/2010 | Kopikare et al. | |
| 2010/0046455 | A1* | 2/2010 | Wentink | H04W 76/10 370/329 |
| 2010/0153727 | A1* | 6/2010 | Reznik | H04W 12/0431 713/171 |
| 2010/0165896 | A1* | 7/2010 | Gong | H04W 52/0216 370/311 |
| 2010/0177712 | A1* | 7/2010 | Kneckt | H04W 76/14 370/329 |
| 2010/0271995 | A1* | 10/2010 | Seok | H04W 52/0219 370/311 |
| 2010/0332822 | A1* | 12/2010 | Liu | H04L 63/08 713/151 |
| 2011/0007692 | A1 | 1/2011 | Seok | |
| 2011/0034127 | A1* | 2/2011 | Wentink | H04W 76/12 455/41.2 |
| 2011/0038291 | A1* | 2/2011 | Seok | H04W 52/0235 370/311 |
| 2011/0069689 | A1* | 3/2011 | Grandhi | H04W 76/23 370/338 |
| 2011/0103264 | A1* | 5/2011 | Wentink | H04W 8/005 370/255 |
| 2011/0116488 | A1* | 5/2011 | Grandhi | H04W 28/18 370/338 |
| 2012/0051240 | A1* | 3/2012 | Dwivedi | H04W 76/14 370/252 |
| 2012/0151089 | A1 | 6/2012 | Ponmudi et al. | |

* cited by examiner

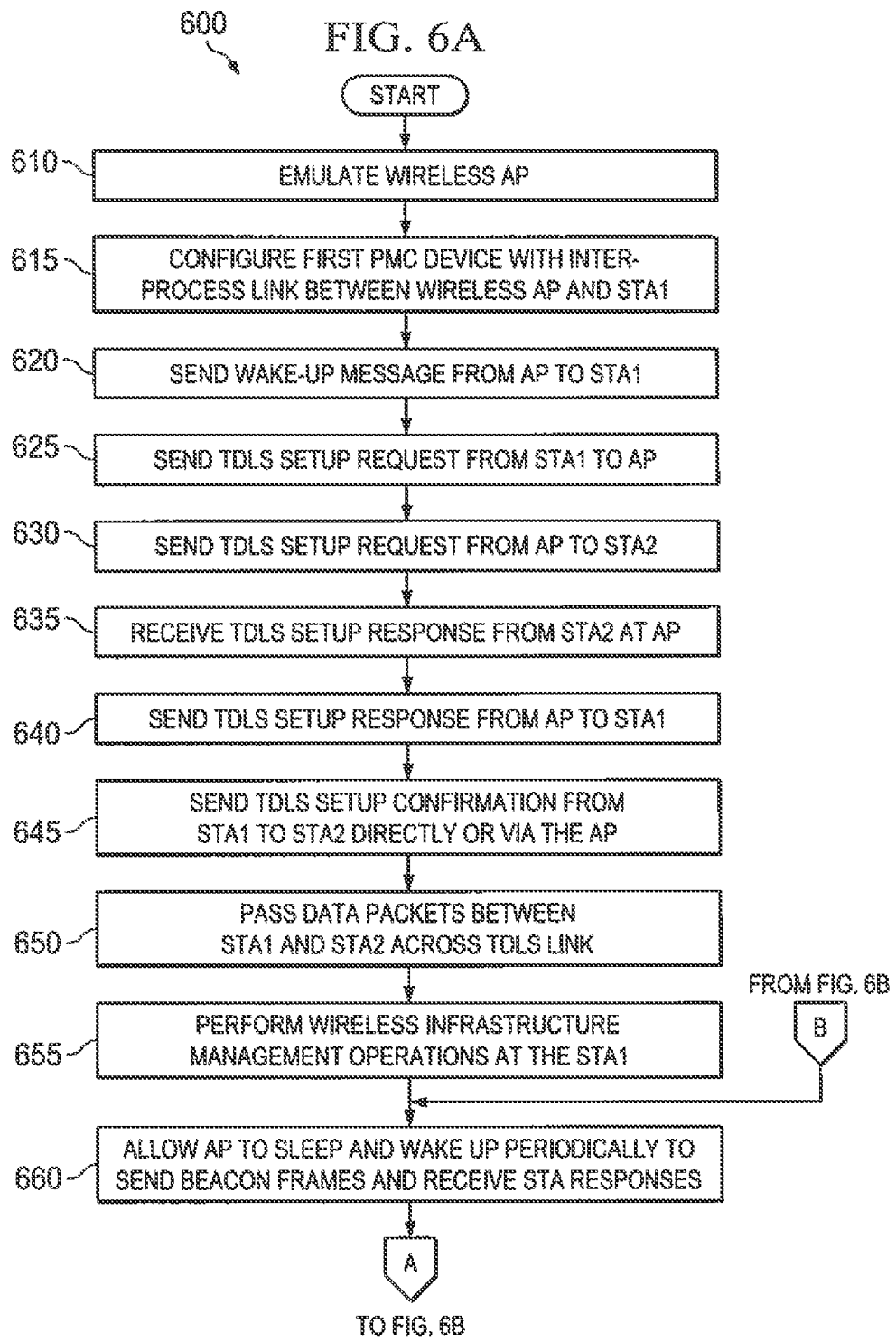

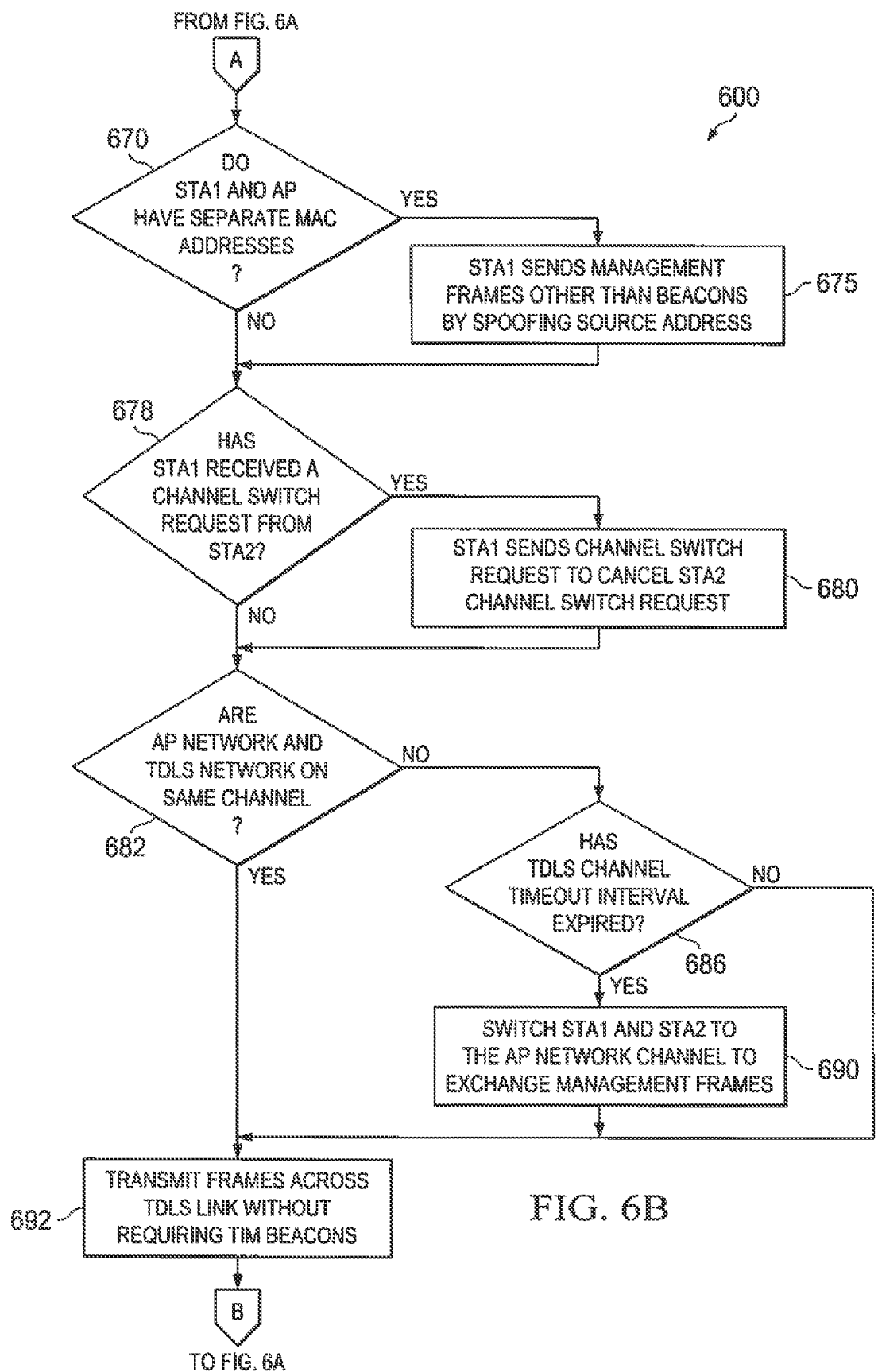

POWER EFFICIENT TUNNELED DIRECT LINK SETUP APPARATUS, SYSTEMS AND METHODS

PRIORITY CLAIM

This application is a continuation of U.S. Non-Provisional application Ser. No. 15/289,837 filed Oct. 10, 2016, which is a continuation-in part of U.S. patent application Ser. No. 14/171,993, filed Feb. 4, 2014, which is a divisional of U.S. patent application Ser. No. 13/109,974, filed May 17, 2011, which claims priority to U.S. Provisional Patent Application No. 61/379,635, filed Sep. 2, 2010, which applications are hereby incorporated herein by reference in their entireties.

TECHNICAL FIELD

Embodiments described herein relate to apparatus, systems and methods associated with wireless communication technology, including structures and methods associated with wireless peer-to-peer and bridged-device communication.

BACKGROUND INFORMATION

Personal mobile communication (PMC) devices such as smart phones and Internet tablet computers are becoming increasingly ubiquitous. One factor driving the popularity of these devices is the rapid growth of so-called "social networking" applications and systems. Advances in social networking technology have enabled members of society to establish and maintain increasingly intimate social relationships across long distances via the Internet.

Many PMC devices are designed to connect to the Internet wirelessly in order to support mobility. A PMC device may connect wirelessly via data links associated with a cell phone connection, a wide area networking connection such as an Institute of Electrical and Electronic Engineers (IEEE) 802.16 connection, and/or a local area networking connection such as an IEEE 802.11 connection, among others.

Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

In some cases, it may be desirable for two or more people within a local area to connect wirelessly and share data without traversing the Internet. People at a party or other gathering may, for example, wish to transfer pictures between PMC devices. The 802.11 specification supports such a connection in ad hoc mode. However, configuring a PMC device to operate in 802.11 ad hoc mode is cumbersome, rendering this technique inappropriate for impromptu data sharing. Other methods may utilize 802.11 infrastructure mode. However, an 802.11 infrastructure network is not always available on an impromptu basis when needed.

BRIEF DESCRIPTION OF THE DRAWINGS

FIGS. 6A and 6B are flow charts illustrating a number of methods associated with various example embodiments.

SUMMARY OF THE INVENTION

Embodiments and methods herein enable peer-to-peer and/or bridged communication between PMC devices operating as stations in a wireless network such as an 802.11 network. At least one of the PMC devices incorporates an emulated wireless AP module. The wireless AP module communicates in infrastructure mode with other in-range PMC devices. The wireless AP module establishes a tunneled direct-link setup (TDLS) session between a station module collocated with the wireless AP module and a station module incorporated into a second PMC device. In some embodiments, the emulated AP module may establish TDLS sessions between the collocated station module and station modules incorporated into two or more additional PMC devices. In that case, the collocated station module may bridge communication sessions between PMC devices that might otherwise be unable to decode each other's transmissions.

After establishing the TDLS session, the wireless AP module is allowed to sleep, waking up periodically to send infrastructure-mode beacon frames. The station modules incorporated into the two PMC devices communicate directly thereafter within the TDLS session. The station module collocated with the wireless AP module may also handle infrastructure management frames that would otherwise be handled by the wireless AP module. These embodiments and methods provide local area peer-to-peer and/or bridged communication between PMC devices using existing 802.11 or similar station resources while conserving battery charge by limiting wireless AP activity.

DETAILED DESCRIPTION

Figure 1:
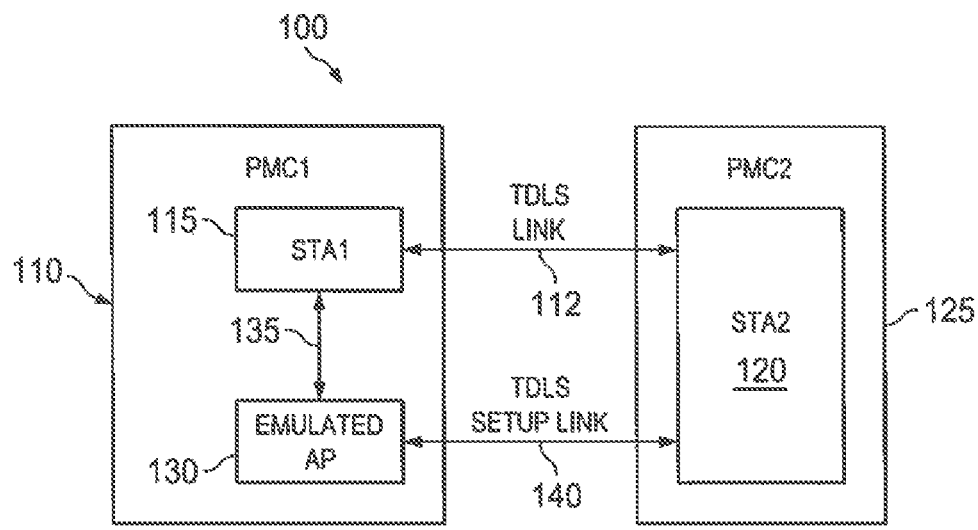
FIG. 1 is a block diagram of a system including two PMC devices capable of wireless peer-to-peer communication according to various example embodiments of the invention.

FIG. 1 is a block diagram of a system 100 including two PMC devices capable of wireless peer-to-peer communication according to various example embodiments of the invention. A first PMC device (PMC1) 110 includes a first station module (STA1) 115. In one embodiment STA1 115 includes a wireless transceiver coupled to an antenna, a processor coupled to said transceiver having associated memory that stores computer executable instructions for running an 802.11 wireless local area network and TDLS protocols, that when executed 802.11 WLAN establishes in infrastructure mode a basic service set that comprises an access point and all associated stations, while TDLS protocol establishes a TDLS connection among station in the network. The STA1 115 is capable of entering into a TDLS session across a TDLS link 112 with a second station module (STA2) 120 located at a second PMC device (PMC2) 125.

The PMC1 110 also includes an emulated wireless AP module 130 communicatively coupled to the STA1 115. The AP module 130 communicates with the STA2 120 in infrastructure mode to establish TDLS sessions between the STA1 115 and the STA2 120. An infrastructure association between the wireless AP module 130 and the STA2 120 may be referred to hereinafter as a "TDLS setup link" (e.g., the TDLS setup link 140).

The first PCM device 110 further includes an interprocess communication link 135 coupled to the STA1 115 and to the AP module 130. The interprocess communication link 135 provides a path for passing messages between the STA1 115 and the AP module 130. The STA1 115 and the AP module 130 communicate across the interprocess communication link 135 to establish TDLS sessions without passing over-the-air TDLS setup frames, as further described below.

Figure 2:
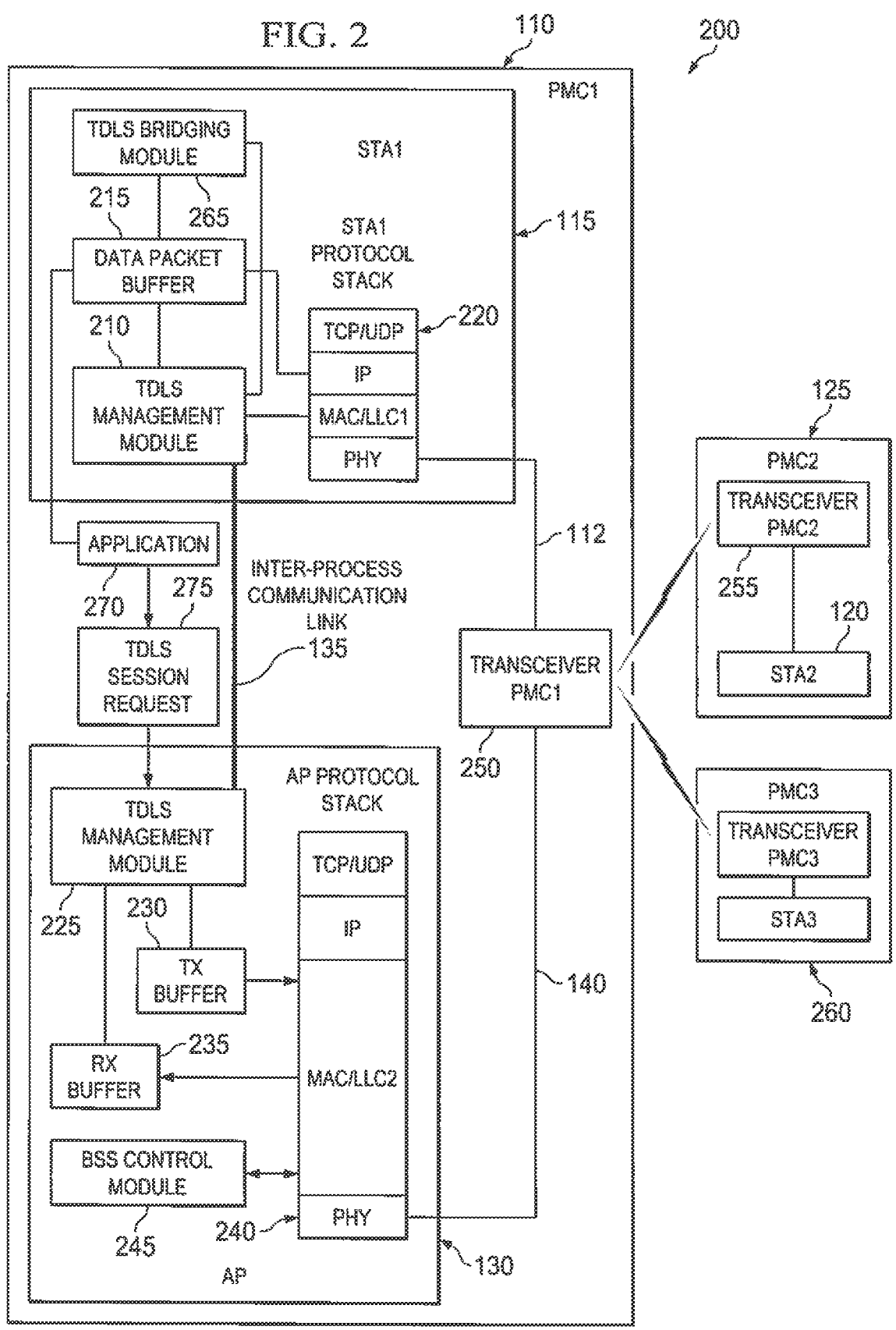
FIG. 2 is a detailed block diagram of a PMC device within a system according to various example embodiments.

FIG. 2 is a detailed block diagram of a PMC device (e.g., the PMC1 110 of FIGS. 1 and 2) within a system (e.g., the system 100 of FIG. 1) according to various example embodiments. The PMC1 110 includes collocated station and emulated wireless AP modules (e.g., the STA1 115 and the AP module 130, respectively, of FIGS. 1 and 2) and is capable of communicating with a second PMC device (e.g., the PMC2 125 of FIGS. 1 and 2). In one embodiment, emulated wireless access point module 130 includes a transceiver coupled to an antenna and an Ethernet connection, a processor coupled to said transceiver having associated memory that stores computer executable instructions for running an 802.11 wireless local area network TDLS, and Ethernet protocols, that when executed allows an AP to connect to the Ethernet network and allows wireless devices to connected to the wired Ethernet using 802.11 WLAN protocol.

The STA1 115 also includes a first TDLS management module 210. In one embodiment, TDLS management module 210 includes software residing in memory in STA 115 that implements TDLS protocol that, when executed, establishes TDLS connection between STA 115 and STA2 perhaps STA3. The first TDLS management module 210 performs TDLS handshaking operations with the AP module 130 during establishment of a TDLS session. The STA1 115 also includes a data packet buffer 215 communicatively coupled to the TDLS management module 210. The data packet buffer 215 stores data packets sent to and received from the STA2 120 following the establishment of a TDLS session.

The STA1 115 may also include a first protocol stack 220 communicatively coupled to the TDLS management module 210 and to the data packet buffer 215. The first protocol stack 220 directs data flow between the STA1 115 and the STA2 120 across the TDLS link 112 following the establishment of a TDLS session. The first protocol stack 220 also directs the flow of BSS control frames between the TDLS management module 210 and the STA2 across the TDLS link 112 while the emulated AP 130 is sleeping.

The AP module 130 further includes a second TDLS management module 225. The second TDLS management module 225 is communicatively coupled to the first TDLS management module 210 via an interprocess communication link 135. The second TDLS management module 225 initiates TDLS sessions and performs TDLS handshaking operations with the STA1 115 during the establishment of a TDLS session.

The AP module 130 may also include a transmit buffer 230 communicatively coupled to the TDLS management module 225. The transmit buffer 230 stores TDLS establishment messages received from the STA1 115 across the interprocess communication link 135 for transmission to the STA2 120. The AP module 130 may also include a receive buffer 235 communicatively coupled to the second TDLS management module 225. The receive buffer 235 stores TDLS response messages received from the STA2 120 prior to forwarding the response messages to the STA1 115 across the interprocess communication link 135.

In some embodiments, the AP module 130 may include a second protocol stack 240 communicatively coupled to the transmit buffer 230. The second protocol stack 240 causes TDLS request messages from the second TDLS management module 225 to be inserted into TDLS control frames for transmission to the STA2 120 across the TDLS setup link 140. The second protocol stack 240 may also be communicatively coupled to the receive buffer 235 to direct incoming TDLS response messages to the receive buffer 235.

The AP module 130 also includes a basic service set (BSS) control module 245 communicatively coupled to the second protocol stack 240. The BSS control module 245 includes software residing in memory that, when implemented, maintains 802.11 WLAN connections and control network configuration of AP and all associated station. BSS control module 245 further generates BSS control frames, including beacon frames, for transmission to the STA2 120 across the TDLS setup link 140. The BSS control module 245 also receives BSS control frame responses from the STA2 120.

The PMC1 110 further includes a first transceiver 250 communicatively coupled to the STA1 115 and to the wireless AP emulation module 130. The first transceiver 250 transmits outbound frames to a second transceiver 255 incorporated into the PMC2 125. The first transceiver 250 also receives inbound frames from the second transceiver 255. It is noted that some embodiments may include separate transceivers for the STA1 115 and the emulated AP 130.

Some embodiments of the PMC1 110 may be capable of a bridged mode of operation. Operating in bridged mode, the PMC1 110 establishes separate TDLS links with the PMC2 125 and with one or more additional PMC devices (e.g. the PMC3 260), as further described below. The PMC1 110 may thus include a TDLS bridging module 265 coupled to the data packet buffer 215. The TDLS bridging module 265 passes data packets between the STA2 and the STA3 during bridged-mode operation. Bridged-mode embodiments may enable communication between two or more PMC devices separated by a distance that might otherwise be too great for the respective stations to decode each other's transmissions.

Figure 3:
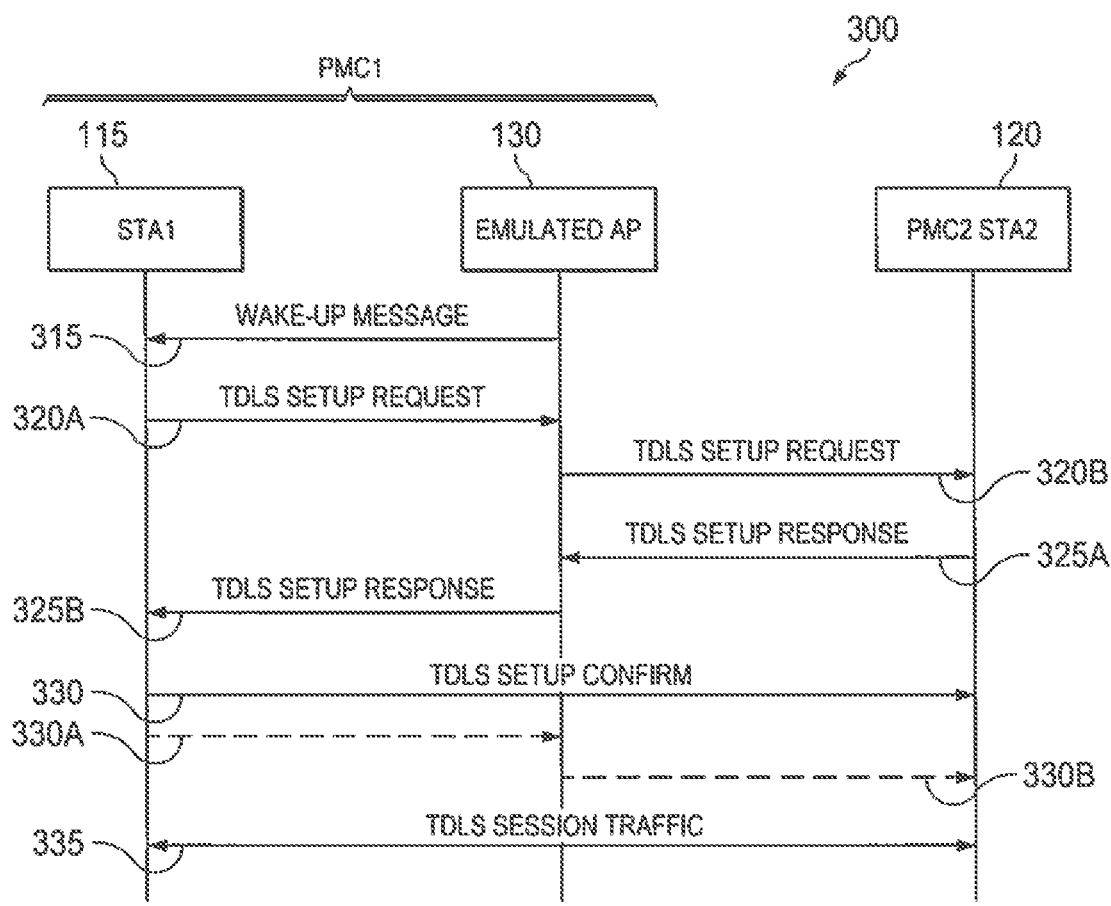
FIG. 3 is a sequence diagram illustrating handshaking operations between a first wireless station incorporated into a first PMC device, a collocated emulated wireless AP, and a second wireless station incorporated into a second PMC device according to various example embodiments.

FIG. 3 is a sequence diagram 300 illustrating handshaking operations between a first wireless station incorporated into a first PMC device (e.g., the STA1 115 incorporated into the PMC1 110), a collocated emulated wireless AP (e.g., the AP module 130), and a second station incorporated into a second PMC device (e.g., the STA2 120 incorporated into the PMC2 125) according to various example embodiments.

Referring to FIG. 3 in light of FIG. 2, an application 270 executing at the first PMC 110 may request a TDLS session at a TDLS session request module 275. The TDLS session request module 275 passes the TDLS session request to the second TDLS management module 225 at the AP module 130. The second TDLS management module 225 initiates a TDLS setup sequence by sending a wake-up message 315 across the interprocess communication link 135 to the first TDLS management module 210 located at the STA1 115. The wake-up message 315 enables the STA1 115 for participation in a TDLS exchange.

The first TDLS management module 210 responds to the wake-up message 315 by sending a TDLS setup request message 320A across the interprocess communication link 135 to a transmit buffer 230 associated with the AP module 130. The AP module 130 forwards the TDLS setup request message 320A (renamed to "TDLS setup request message 320B") across the TDLS setup link 140 of FIGS. 1 and 2 to the STA2 120 located at the PMC2 125.

The receive buffer 235 at the AP module 130 receives a TDLS setup response message 325A from the STA2 120. The AP 130 forwards the TDLS setup response message 325A (renamed to "TDLS setup response message 325B") across the interprocess communication link 135 to the first TDLS management module 210. At this point, a TDLS link (e.g., the TDLS link 112 of FIGS. 1 and 2) is established between the STA1 115 and the STA2 120. The first TDLS management module 210 sends a TDLS setup confirmation message 330 to the STA2, either directly across the TDLS link 112 (e.g., the confirmation message 330) or via the AP 130 across the TDLS setup link 140 (e.g., the confirmation messages 330A and 330B). Thereafter, the STA1 115 and the STA2 120 may exchange TDLS session traffic 335 across the TDLS link 112.

Figure 4:
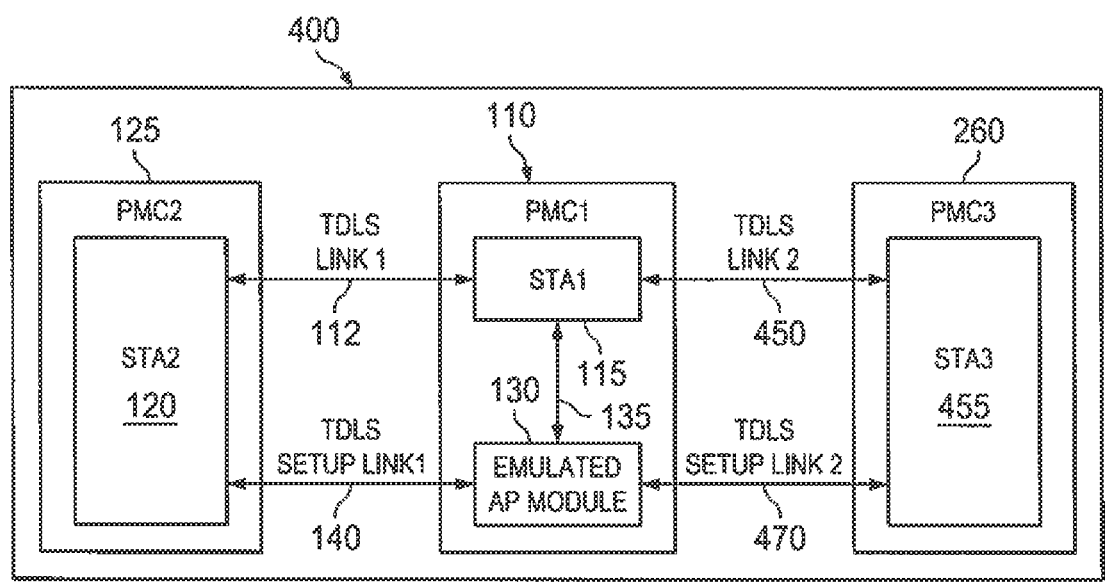
FIG. 4 is a block diagram of a system including three PMC devices capable of bridged communication according to various example embodiments.

FIG. 4 is a block diagram of a system 400 including three PMC devices capable of bridged communication according to various example embodiments. The system 400 includes PMC1 110, as previously described in the context of FIGS. 1 and 2. STA1 115, incorporated into PMC1 110, is configured to communicate with STA2 120 incorporated into PMC2 125 and with STA3 455 incorporated into PMC3 260. The PMC1 110 may act as a repeater for data flow between STA2 120 and STA3 455.

An emulated AP module 130 incorporated into the PMC1 110 may communicate with a collocated STA1 115 via an interprocess communication link 135, as previously described. Operating together as previously described for the two station case, the AP module 130 and the STA1 115 may establish a first TDLS session across the first TDLS link 112 between the STA1 and the STA2 120. The AP module 130 and the STA1 115 may also establish a second TDLS session across a second TDLS link 450 between the STA1 115 and the STA3 455.

In some embodiments, the STA1 115 may operate as a communication bridge to pass TDLS messages between the STA2 120 and the STA3 455, as previously described. In this mode, a bridged link may be established between the STA2 120 and the STA3 455. The bridged link may be useful in the case of two stations separated by a distance that would otherwise be too great for accurate decoding of each other's transmissions.

Figure 5:
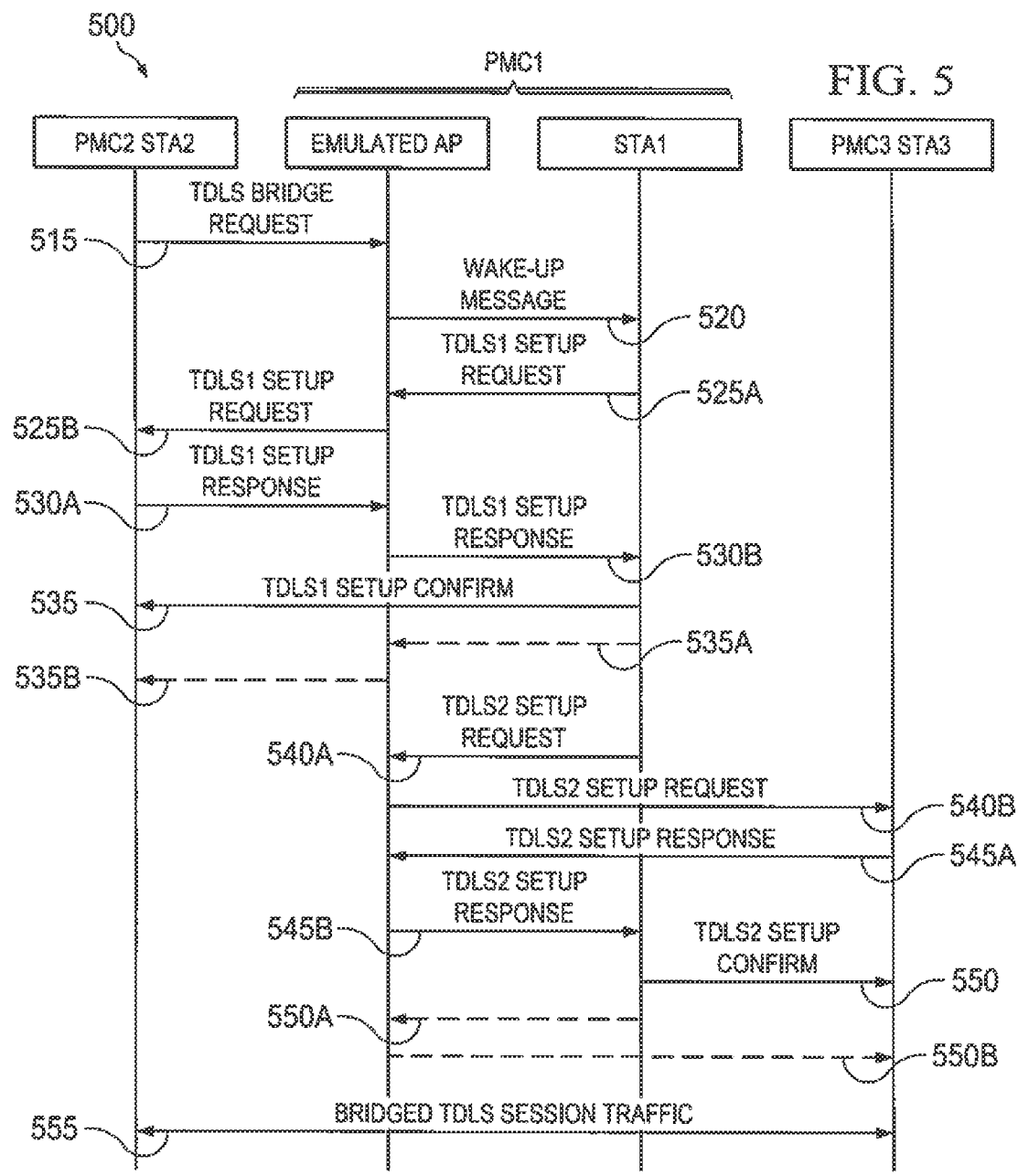
FIG. 5 is a sequence diagram illustrating handshaking operations between a first wireless station incorporated into a first PMC device with a collocated emulated wireless AP module and two additional wireless stations incorporated into second and third PMC devices, respectively, according to various example embodiments.

FIG. 5 is a sequence diagram 500 illustrating handshaking operations between a first wireless station incorporated into a first PMC device (e.g., the STA1 115 of FIG. 4 incorporated into the PMC1 110) with a collocated emulated wireless AP module (e.g., the wireless AP 130) and two additional wireless stations (e.g. the STA2 120 and the STA3 455 of FIG. 4) incorporated into second and third PMC devices (e.g., the PMC2 125 and the PMC3 260 of FIG. 4) according to various example embodiments.

Referring to FIG. 5 in light of FIG. 4, a TDLS bridge request 515 may be received at the AP module 130 from either the STA2 120 or the STA3 455. (The example of FIG. 5 shows the bridge request originating at the STA2 120 and being received at the first TDLS setup link 140.) The TDLS bridge request 515 causes a wake-up message 520 to be issued by the AP module 130 and sent across the interprocess communication link 135 to the STA1 115. The message 520 causes the STA1 115 to send a first TDLS setup request message 525A to the AP module 130. The AP module 130 forwards the first TDLS setup request message 525A to the STA2 120 across the first TDLS setup link 140 as first TDLS setup request message 525B.

The AP module 130 receives a first TDLS setup response message 530A from the STA2 120 at the first TDLS setup link 140 and forwards that message to the STA1 115 across the interprocess communication link 135 as first TDLS setup response message 530B. At this point the first TDLS link 112 has been established. The STA1 115 may send a first TDLS setup confirmation message 535 to the STA2 120, either directly across the first TDLS link 112 or via the AP module 130 across the first TDLS setup link 140. The latter technique is shown on the sequence diagram 500 as TDLS1 setup confirmation messages 535A and 535B.

The second TDLS link 450 between the STA1 115 and the STA3 455 is set up in like manner. That is, the STA1 115 may send a second TDLS setup request message 540A to the AP module 130 across the interprocess communication link 135. The AP module 130 forwards the second TDLS setup request message 540A to the STA3 455 across a second TDLS setup link 470 as TDLS setup request message 540B.

The AP module 130 receives a second TDLS setup response message 545A from the STA3 455 at the second TDLS setup link 470. The AP module 130 then forwards that message to the STA1 115 across the interprocess communication link 135 as second TDLS setup response message 545B. At that point, the second TDLS link 450 has been established and the STA1 115 may send a second TDLS setup confirmation message 550 to the STA3 455. The second TDLS setup confirmation message 550 may be sent either directly across the second TDLS link 450 or via the AP module 130 across the TDLS setup link 470. The latter technique is shown on the sequence diagram 500 as TDLS2 confirmation messages 550A and 550B. Thereafter, TDLS session traffic 555 between the STA2 120 and the STA3 455 may be bridged by the STA1 115 across the first and second TDLS links 112 and 450, respectively.

The systems 100, 200, 400; the PMC devices 110, 125, 260; the station modules 115, 120, 455; the TDLS links 112, 450; the TDLS setup links 140, 470; the AP module 130; the interprocess communication link 135; the TDLS management modules 210, 225; the buffers 215, 230, 235; the protocol stacks 220, 240; the BSS control module 245; the transceivers 250, 255; the bridging module 265; the application 270; the session request module 275; the sequence diagrams 300, 500; the messages 315, 320A, 320B, 325A, 325B, 330, 330A, 330B, 515, 520, 525A, 525B, 530A, 530B, 535, 535A, 535B, 540A, 540B, 545A, 545B, 550, 550A, 550B; and the session traffic 335, 555 may all be characterized as "modules" herein.

Such modules may include hardware circuitry, optical components, single or multi-processor circuits, memory circuits, and/or computer-readable media with computer instructions encoded therein/thereon and capable of being executed by a processor (excluding non-functional descriptive matter), firmware, and combinations thereof, as desired by the architects of the systems 100, 200, and 400 and as appropriate for particular implementations of various embodiments.

Apparatus and systems described herein may be useful in applications other than enabling peer-to-peer and/or bridged communication between PMC devices operating as 802.11 stations. Examples of the systems 100, 200, and 400 described herein are intended to provide a general understanding of the structures of various embodiments. They are not intended to serve as complete descriptions of all elements and features of apparatus and systems that might make use of these structures.

The various embodiments may be incorporated into electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may also include one or more methods.

FIGS. 6A and 6B are flow charts illustrating a number of methods associated with various example embodiments. A method 600 sequences to provide wireless peer-to-peer and/or bridged communication between PMC devices by establishing a TDLS session between a STA1 incorporated into a PMC1 and a STA2 incorporated into a PMC2.

The method 600 commences at block 610 with emulating a wireless AP at the PMC1. The method 600 continues at block 615 with configuring the PMC1 with an interprocess communication link between the emulated wireless AP and the STA1. The method 600 includes sending a wake-up message from the emulated wireless AP to the STA1 to initiate establishment of the TDLS session, at block 620.

The method 600 proceeds at block 625 with sending a TDLS setup request message from the STA1 to the emulated wireless AP. The method 600 includes sending the TDLS setup request message from the emulated wireless AP to the STA2, at block 630. The wireless AP sends the TDLS setup request message to the STA2 across a link corresponding to an infrastructure association between the wireless AP and the STA2 referred to herein as a "TDLS setup link." The method also includes receiving a TDLS setup response message from the STA2 at the emulated wireless AP, at block 635. The method 600 further includes sending the TDLS setup response message from the emulated wireless AP to the STA1, at block 640.

The method 600 may also include sending a TDLS setup confirmation message from the STA1 to the STA2 to confirm establishment of the TDLS session, at block 645. The TDLS setup confirmation message may be sent directly from the STA1 to the STA2 across the newly-established TDLS link. Alternatively, the confirmation message may be sent via the emulated wireless AP across the TDLS setup link. The method 600 may proceed at block 650 with passing data packets between the STA1 and the STA2 across the TDLS link.

The method 600 may continue at block 655 with performing wireless infrastructure management operations at the STA1. Such operations may include including originating network management frames other than beacons and receiving network management frame responses. The method 600 may also include allowing the wireless AP to sleep during the TDLS session, waking up periodically to send beacon frames, at block 660. Doing so may permit longer sleep periods at the wireless AP.

In some embodiments, the STA1 and the wireless AP may have separate MAC addresses. The method 600 may test for this condition at block 670. In the case of separate MAC addresses, some versions of the method 600 may include MAC address "spoofing." That is, a MAC source address associated with the wireless AP may be inserted into network management frames originating at the STA1 in order to spoof the STA2, at block 675.

The method 600 may perform additional power saving activities, as follows. The method 600 may include listening for a channel switch request from the STA2, at block 678. If a channel switch request is received from the STA2, the method 600 may include sending a channel switch request from the STA1 to the STA2 in order to cancel the channel switch request received from the STA2, at block 680. Doing so may permit the wireless AP to remain in sleep mode for an extended period of time.

The method 600 may continue at block 682 with determining whether a transceiver channel assigned to carry TDLS data traffic between the STA1 and the STA2 is also assigned to carry wireless AP beacon traffic. If it is determined that the TDLS data traffic is assigned to a different channel than that of the wireless AP beacon traffic, the method 600 may include determining whether a TDLS channel timeout interval associated with the TDLS data traffic has expired, at block 686. If the TDLS channel timeout interval has expired, the method 600 may also include switching the STA1 and the STA2 to the transceiver channel to which the wireless AP beacon traffic is assigned, at block 690. The STA1 and the STA2 are each switched within an appropriate time period such that management frames may be exchanged without packet loss. As a consequence of the above-described activities, the method 600 may continue at block 692 with transmitting frames across the TDLS link without requiring the transmission of traffic indication message (TIM) beacons. The method 600 may return to the beginning of block 660 in order to loop through the power saving activities represented by blocks 660 through 692.

A method analogous to the method 600 may be performed by a PMC device incorporating an emulated AP in communication with two other PMC devices arranged in a bridged configuration as illustrated in FIG. 4. Activities associated with the analogous method proceed as previously described with reference to FIG. 5.

It is noted that the activities described herein may be executed in an order other than the order described. The various activities described with respect to the methods identified herein may also be executed in repetitive, serial, and/or parallel fashion. In some embodiments, for example, the method 600 may repeat in whole or in part as various applications associated with a PMC device are switched on and off during operation.

Apparatus, systems, and methods described herein provide TDLS-based peer-to-peer and/or bridged communication between PMC devices operating in a wireless network such as an 802.11 network. After establishing a TDLS session, an emulated wireless AP module is allowed to sleep during the session, and need wake up only periodically to send infrastructure-mode beacon frames. The station module collocated with the wireless AP module handles infrastructure management frames during wireless AP sleep periods. These embodiments and methods may conserve battery charge by limiting wireless AP activity.

Although the inventive concept may include embodiments described in the example context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11 standard may be found in ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications (published 1999; reaffirmed June 2003). Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. § 1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:
1. A method comprising:
receiving, by an emulated access point (AP) of a first device, over a wireless channel, a tunneled direct-link setup (TDLS) bridge request from a second device associated with communication between the second device and a third device;
based on the receiving of the TDLS bridge request, transmitting, by the emulated AP, over an interprocess communication link, a wake-up message to a station module of the first device;
forwarding, by the emulated AP, a first TDLS set-up request from the station module of the first device to the second device;
forwarding, by the emulated AP, a second TDLS set-up request from the station module of the first device to the third device; and
causing the station module of the first device to bridge communication between the second device and the third device.
2. The method of claim 1, wherein:
the wireless channel is a first wireless channel;
the forwarding of the first TDLS set-up request includes:
receiving, by the emulated AP over the interprocess communication link, the first TDLS set-up request from the station module; and
transmitting, by the emulated AP over the first wireless channel, the first TDLS set-up request to the second device; and
the forwarding of the second TDLS set-up request includes:
receiving, by the emulated AP over the interprocess communication link, the second TDLS set-up request from the station module; and
transmitting, by the emulated AP over a second wireless channel, the first TDLS set-up request to the third device.

3. The method of claim 1 further comprising:
forwarding, by the emulated AP, a first TDLS set-up response from the second device to the station module of the first device; and
forwarding, by the emulated AP, a second TDLS set-up response from the third device to the station module of the first device.

4. The method of claim 3, wherein:
the wireless channel is a first wireless channel;
the forwarding of the first TDLS set-up response includes:
    receiving, by the emulated AP over the first wireless channel, the first TDLS set-up response from the second device; and
    transmitting, by the emulated AP over the interprocess communication link, the first TDLS set-up response to the station module; and
the forwarding of the second TDLS set-up response includes:
    receiving, by the emulated AP over a second wireless channel, the second TDLS set-up response from the third device; and
    transmitting, by the emulated AP over the interprocess communication link, the second TDLS set-up response to the station module.

5. The method of claim 3 further comprising:
based on the first TDLS set-up response, transmitting, by the station module, a first TDLS set-up confirmation to the second device; and
based on the second TDLS set-up response, transmitting, by the station module, a second TDLS set-up confirmation to the third device.

6. The method of claim 5, wherein the transmitting, by the station module, of the first TDLS set-up confirmation includes the emulated AP forwarding the first TDLS set-up confirmation from the station module to the second device.

7. The method of claim 5, wherein the transmitting, by the station module, of the first TDLS set-up confirmation includes the station module transmitting the first TDLS set-up confirmation directly without the emulated AP forwarding the first TDLS set-up confirmation from the station module to the second device.

8. The method of claim 1, wherein:
the receiving of the TDLS bridge request and the forwarding of the first TDLS set-up request are performed over a first setup link;
the forwarding of the second TDLS set-up request is performed over a second setup link; and
the bridging of communication between the second device and the third device is performed over a set of links that does not include the first setup link or the second setup link.

9. A method comprising:
receiving, by a station of a first device, over an interprocess communication channel, a wake-up message from an access point module of the first device;
transmitting, by the station, over the interprocess communication channel, a first tunneled direct-link setup (TDLS) set-up request to the access point module, wherein the first TDLS set-up request is directed to a second device;
receiving, by the station, over the interprocess communication channel, a first TDLS setup response sent by the second device;
transmitting, by the station, over a first TDLS channel, a first TDLS setup confirm message to the second device;
transmitting, by the station, over the interprocess communication channel, a second TDLS set-up request to the access point module, wherein the second TDLS set-up request is directed to a third device;
receiving, by the station, over the interprocess communication channel, a second TDLS setup response sent by the third device;
transmitting, by the station over a second TDLS channel, a second TDLS setup confirm message to the third device; and
bridging, by the station of the first device, communication between the second device and the third device.

10. The method of claim 9 further comprising:
transmitting, by the access point module, the first TDLS set-up request to the second device; and
transmitting, by the access point module, the second TDLS set-up request to the third device.

11. The method of claim 10, wherein:
the transmitting, by the access point module, of the first TDLS set-up request to the second device is over a first TDLS set-up channel that is different from the first TDLS channel; and
the transmitting, by the access point module, of the second TDLS set-up request to the third device is over a second TDLS set-up channel that is different from the second TDLS channel.

12. The method of claim 9, wherein the bridging of communication between the second device and the third device is performed over the first and second TDLS channels.

13. The method of claim 9 further comprising:
receiving, by the access point module, a TDLS bridge request from the second device; and
providing the wake-up message from the access point module to the first device based on the TDLS bridge request.

14. A first device comprising:
a station module configured to:
    communicate with a second device via a first wireless link; and
    communicate with a third device via a second wireless link;
an interprocess communication link coupled to the station module; and
an access point module coupled to the station module via the interprocess communication link, wherein the access point module is configured to:
    receive, via a third wireless link, a tunneled direct-link setup (TDLS) bridge request from the second device associated with communication between the second device and the third device;
    based on receiving the TDLS bridge request, provide, over the interprocess communication link, a wake-up message to the station module;
    forward a first TDLS setup request from the station module to the second device; and
    forward a second TDLS setup request from the station module to the third device, wherein the station module is further configured to bridge communication between the second device and the third device.

* * * * *